SYSTEMS FOR INVESTIGATING SPONTANEOUS POTENTIALS IN WELLS

Filed Sept. 9, 1953 8 Sheets-Sheet 1

INVENTOR.
HENRI-GEORGES DOLL
BY
Campbell, Brumbaugh, Free & Graves
HIS ATTORNEYS.

INVENTOR.
HENRI-GEORGES DOLL
BY
Campbell, Brumbaugh, Free & Graves
HIS ATTORNEYS.

April 26, 1955 HENRI-GEORGES DOLL 2,707,266

SYSTEMS FOR INVESTIGATING SPONTANEOUS POTENTIALS IN WELLS

Filed Sept. 9, 1953 8 Sheets-Sheet 3

INVENTOR.
HENRI-GEORGES DOLL
BY
Campbell, Brumbaugh, Free & Graves
HIS ATTORNEYS.

April 26, 1955 HENRI-GEORGES DOLL 2,707,266

SYSTEMS FOR INVESTIGATING SPONTANEOUS POTENTIALS IN WELLS

Filed Sept. 9, 1953 8 Sheets-Sheet 4

INVENTOR.
HENRI-GEORGES DOLL
BY
Campbell, Brumbaugh, Free & Graves
HIS ATTORNEYS.

INVENTOR.
HENRI-GEORGES DOLL
BY
Campbell, Brumbaugh, Free & Graves
HIS ATTORNEYS.

SYSTEMS FOR INVESTIGATING SPONTANEOUS POTENTIALS IN WELLS

Filed Sept. 9, 1953

INVENTOR.
HENRI-GEORGES DOLL
BY
Campbell, Brumbaugh, Free & Graves
HIS ATTORNEYS.

INVENTOR.
HENRI-GEORGES DOLL
BY
Campbell, Brumbaugh, Free & Graves
HIS ATTORNEYS.

April 26, 1955 HENRI-GEORGES DOLL 2,707,266

SYSTEMS FOR INVESTIGATING SPONTANEOUS POTENTIALS IN WELLS

Filed Sept. 9, 1953 8 Sheets-Sheet 8

INVENTOR.
HENRI-GEORGES DOLL
BY
Campbell, Brumbaugh, Free & Graves
*HIS ATTORNEYS.*

United States Patent Office 2,707,266

Patented Apr. 26, 1955

2,707,266

SYSTEMS FOR INVESTIGATING SPONTANEOUS POTENTIALS IN WELLS

Henri-Georges Doll, Ridgefield, Conn., assignor to Schlumberger Well Surveying Corporation, Houston, Tex., a corporation of Delaware Application September 9, 1953, Serial No. 379,107

12 Claims. (Cl. 324—1)

The present invention relates to methods and apparatuses for investigating earth formations and more particularly to novel methods and apparatuses for distinguishing between permeable and impervious formations traversed by a bore hole. More specifically, it has to do with systems of this character in which the depth and thickness of permeable and impervious formations that are surrounded by formations of high resistivity may be ascertained in a highly effective manner.

This application is a continuation-in-part of the applicant's copending application Serial No. 60,872, filed November 19, 1948, for "Selective Spontaneous Potential Well Logging Method and Apparatus."

In the present practice, the location and vertical extent of permeable formations traversed by a bore hole are usually determined by using well logging methods of the type disclosed in Patent No. 1,913,293 to Conrad Schlumberger. According to the methods described in that patent, indications are obtained of naturally occurring, or spontaneous potentials between an electrode moved through the bore hole and a suitably chosen point of reference. It has been found that the interpretation of these spontaneous potentials, hereinafter designated as S. P., is rather difficult in some cases such as, for example, in highly resistive formations. A full discussion of this problem appears in a paper by the applicant entitled "The S. P. Log: Theoretical Analysis and Principles of Interpretation," which was published in the September 1948 issue of Petroleum Technology." Further, except where the formations are of great thickness, the conventional S. P. log does not provide indications of the so-called "Static S. P." of a formation. The latter term, which was coined by the applicant, can be defined as the total E. M. F. causing the flow of the spontaneous currents in the bore hole.

One object of the invention, accordingly, is to provide a novel well logging method and apparatus, in which the spontaneous potential indications obtained in the bore hole can be interpreted with greater ease, whereby permeable and impervious formations may be more readily differentiated from one another.

Another object of the invention is to provide a novel method and apparatus of the above character by means of which the thickness of a permeable formation can be more readily ascertained.

A further object is to provide a novel method and apparatus of the above character including means for providing indications from which the static S. P. of a formation may be deduced.

A still further object is to provide a novel method and apparatus of the above character which enables the location and thickness of earth formations to be determined simultaneously with their electrical resistivity, or conductivity.

These and other objects of the invention are attained by providing a well logging system in which a potential measuring electrode is disposed intermediate two other electrodes in the bore hole, the spacing between the three electrodes being fixed. By maintaining the potential of said two electrodes at a selected, substantially constant value with respect to a reference point, modulated between limits if desired as described hereinafter, it has been found that variations in the potential difference between the measuring electrode and said two electrodes are more truly representative of characteristic E. M. F.'s that are associated with the formations traversed by the bore hole. This is especially true in the case of permeable formations bounded by formations of high resistivity. Whereas the depth and thickness of such permeable formations could be ascertained only with difficulty by prior methods, these data can now be determined clearly and accurately according to the method of the invention.

In order to distinguish logs made according to the present invention from conventional logs of the type disclosed in the aforesaid Schlumberger patent, the former will be designated herein as "Selective S. P." logs.

Other objects and features of the invention will be apparent from the following detailed description of several typical embodiments thereof, taken in conjunction with the accompanying drawings, in which:

Fig. 1 is a schematic diagram of a typical five-electrode system constructed according to the invention;

Figs. 2(*a*), 2(*c*), 2(*d*), 2(*e*) and 2(*f*) are schematic representations of a conventional S. P. log in resistive strata, and several typical Selective S. P. logs obtained under different conditions of operation, respectively;

Figure 11:
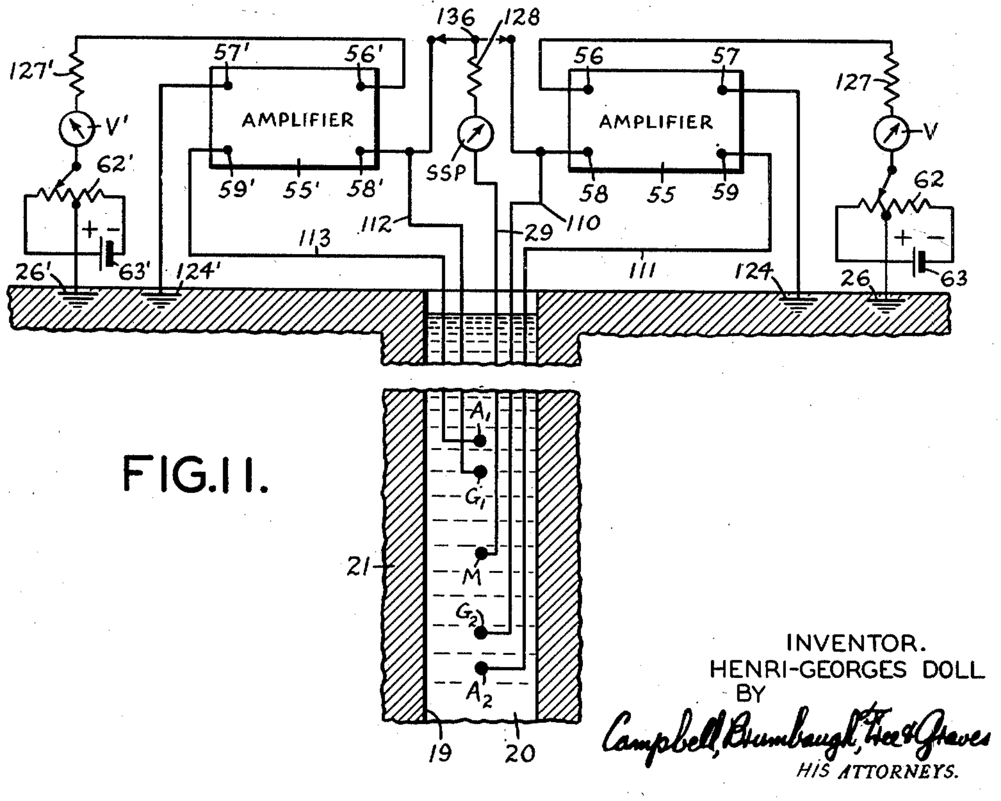
Figure 7A:
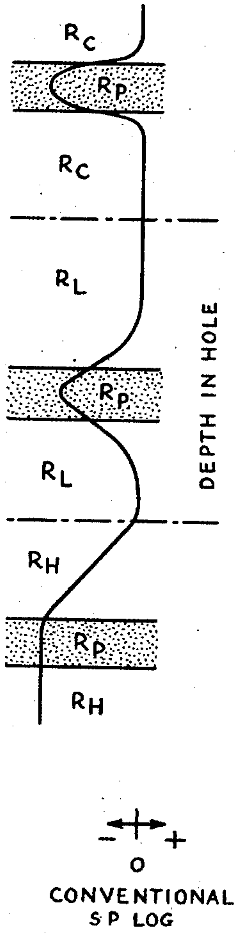
Figure 7B:
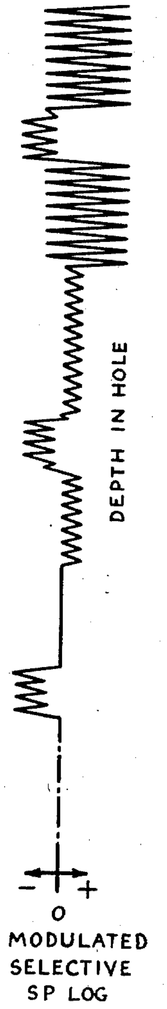
Figure 7C:
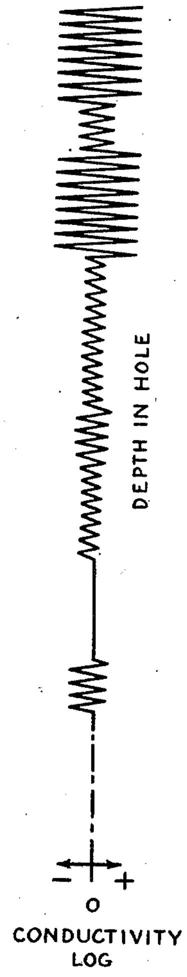
Figures 8A, 8B, 8C:
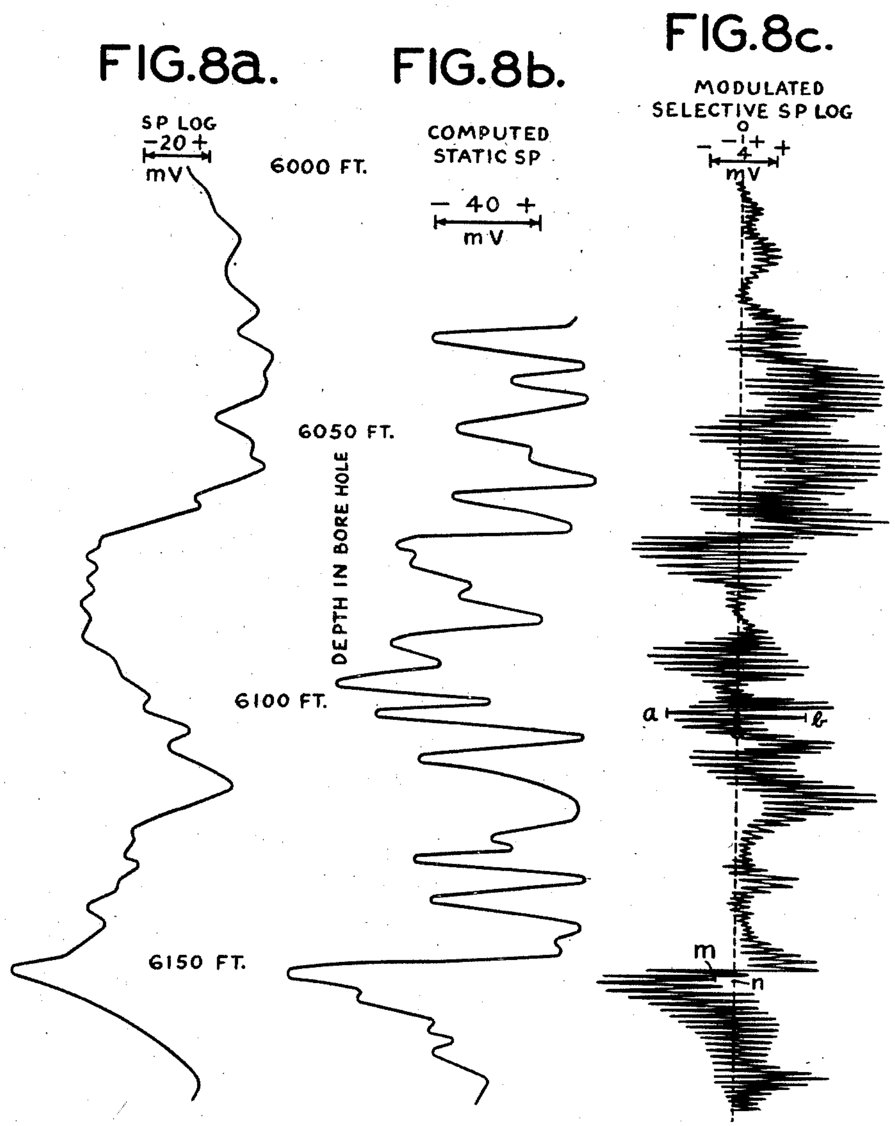
Figures 9, 10:
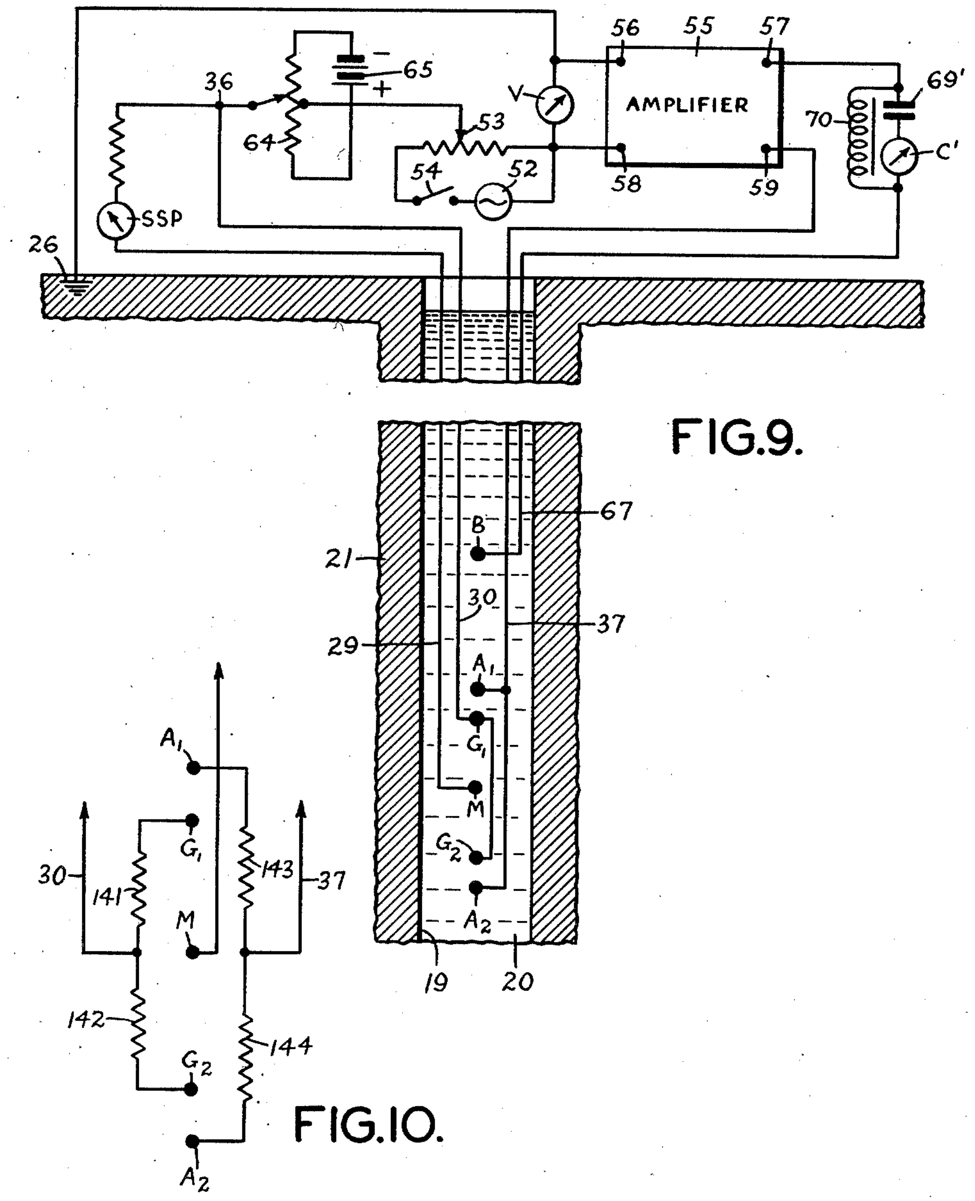
Figures 12, 13:
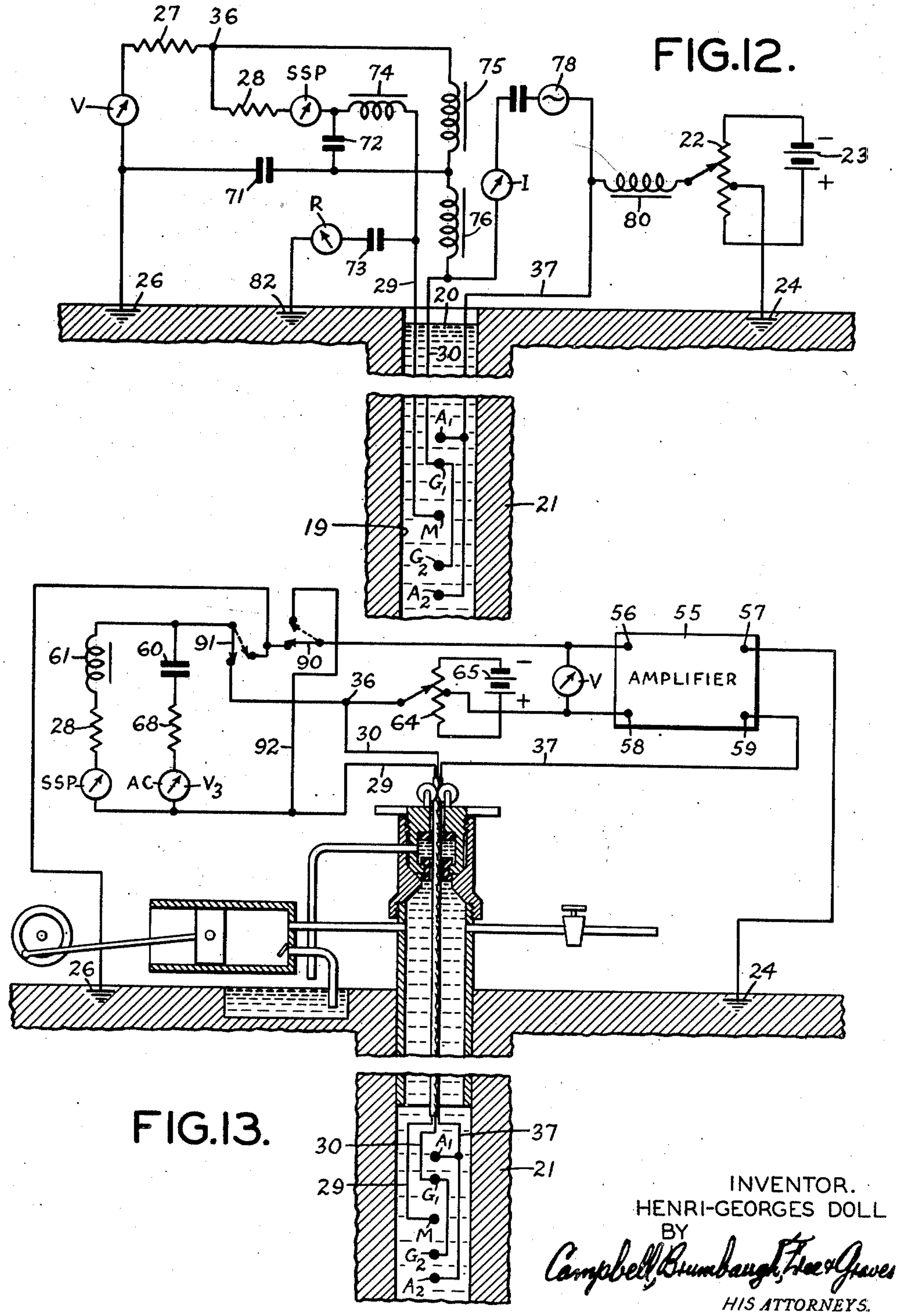

Figs. 7(*a*), 7(*b*) and 7(*c*) show schematically a conventional S. P. log and representative logs of Selective S. P. and electrical conductivity made according to the invention, respectively;

Figs. 8(*a*), 8(*b*) and 8(*c*) show a conventional S. P. log, a computed Static S. P. log, and a typical field example of a Modulated Selective S. P. log, respectively;

Fig. 9 is a schematic diagram of a further embodiment which enables a modulated Selective S. P. log and a conductivity log to be recorded simultaneously;

Fig. 10 illustrates an alternative form of electrode connection according to the invention;

Fig. 11 illustrates schematically another modification in which separate and automatic controls are used for each electrode whose potential is to be controlled;

Fig. 12 shows a representative circuit for recording simultaneously a Selective S. P. log and a resistivity log; and Fig. 13 shows further alternative modifications for recording either a Selective S. P. log or a Static S. P. log simultaneously with a pressure vibrated S. P. log.

As disclosed in the aforementioned Schlumberger patent and in the paper by H. G. Doll, the conventional S. P. log is a record of potential drops produced by currents which spontaneous potentials cause to flow in the conducting bore hole liquid and in the surrounding formations. Surprisingly enough, it has been discovered that if a relatively highly conductive path is provided for spontaneous currents flowing in the vicinity of the potential measuring electrode in the bore hole, the logs obtained differentiate more clearly between permeable and impervious formations. It has been found, further, that if the conductive path terminates at two points located on opposite sides of the potential measuring electrode in the direction of the bore hole axis, which points are maintained at a selected fixed potential with respect to a reference point, modulated between limits, if desired, the paths taken by the spontaneous currents are modified with the result that additional important advantages are obtained as will be described hereinafter.

Figures 1, 3:
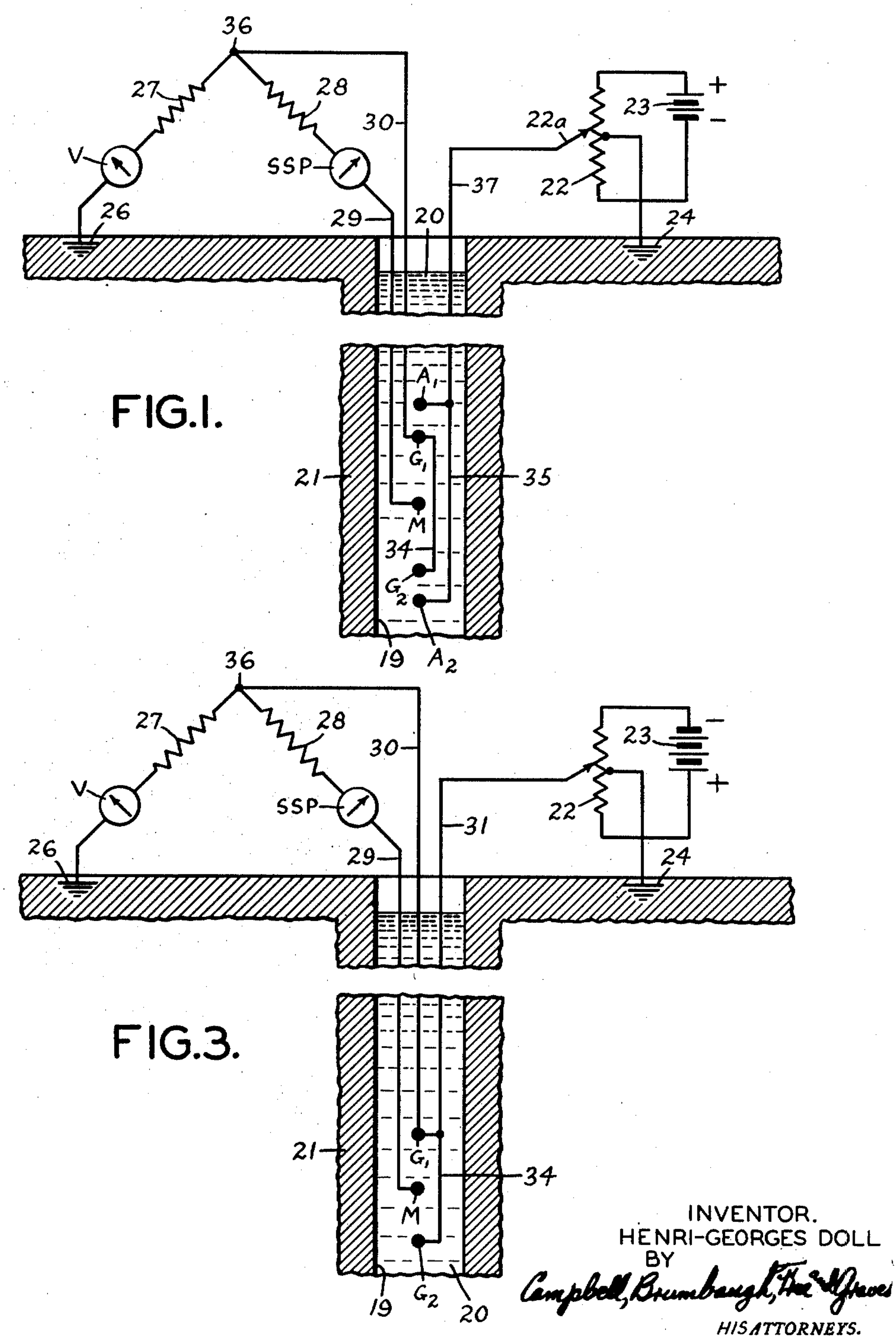
Fig. 3 shows another embodiment of the invention using a three-electrode system, for recording a Selective S. P. log.

One embodiment of the invention is shown in Fig. 1. An electrode array is lowered into a bore hole 20 which usually contains conductive mud. The electrode device may comprise, for example, five electrodes $A_1$, $G_1$, M, $G_2$, and $A_2$, maintained at a constant separation. The electrodes $A_1$ and $A_2$ and connected through an insulated conductor 37 to any suitable power source 23 by means of a potentiometer 22. This circuit, which will be called the power circuit hereinafter, is connected to ground at point 24.

In the vicinity of the electrodes $A_1$ and $A_2$ are placed two electrodes $G_1$ and $G_2$ which are connected to an insulated wire 30 and through a resistance 28 to a meter S. S. P. The other terminal of the meter S. S. P. is connected to another electrode M, through an insulated wire 29. This circuit will hereinafter be called the measuring circuit.

It will also be noted that a meter V is connected to the electrodes $G_1$ and $G_2$ and to a ground electrode 26, through a resistance 27. This part of the circuit will hereinafter be called the control circuit.

The electrode M is situated intermediate the electrodes $G_1$ and $G_2$, while the electrodes $A_1$ and $A_2$ are usually located outside the $G_1$ and $G_2$ electrodes from the electrode M, rather than inside. It is convenient, though not necessary, to use a symmetrical arrangement of these five electrodes, with the electrode M at the center point. In a practical arrangement, the separation distance between the electrodes $G_1$ and $G_2$ may be about eight time the usual bore hole diameter, while the electrodes $A_1$ and $A_2$ may be separated from the corresponding electrodes $G_1$ and $G_2$, respectively, by a distance approximately equal to the radius of the bore hole. However, these distances may be modified appreciably within the scope of this invention.

This group of five electrodes is adapted to be moved along the portion of an open bore hole which contains drilling mud or other conducting fluid. The electrodes are preferably of the impolarizable type; however, in the usual drilling muds, they can be conventional electrodes made of lead, such as are now used in electrical logging.

The power source 23 may comprise a battery or any other suitable source of D. C.; its terminals may be connected to a potentiometer 22 having a contact arm 22a that can be manipulated to vary the magnitude and polarity of the voltage applied between the electrodes $A_1$, $A_2$ and the ground 24. Obviously, any other suitable source of current may be used.

The resistance 28 and the S. S. P. meter together constitute a high resistance millivoltmeter. As such, these two elements could be replaced by an electronic voltmeter, or other potential measuring device; preferably it is adapted to record continuously while the electrode array is moved in the bore hole. Thereby the S. S. P. meter provides a record of the potential difference appearing between the electrode M and the electrodes $G_1$ and $G_2$, which latter electrodes are connected in parallel by the conductor 34.

Similarly, the meter V and the resistance 27 comprise a high resistance millivoltmeter.

In operation, the potential of the electrodes $G_1$ and $G_2$ with respect to the reference electrode or ground 26, is maintained at a particular value while the S. S. P. meter records a log as the electrode system is moved along the uncased bore hole. The potential of the electrodes $G_1$ and $G_2$ with respect to the ground 26 is indicated by the meter V and it can be controlled by changing the current flowing through the electrodes $A_1$ and $A_2$. Accordingly, while the electrode array is moved in the bore hole, the operator adjusts the potentiometer 22 to maintain the reading of the meter V substantially constant at the selected value.

The selection of the value of the potential of the electrodes $G_1$ and $G_2$ with respect to the ground 26 will depend on the type of Selective S. P. log which is desired. For instance, for a log indicative primarily of permeable strata, the electrode system should be first placed opposite a fairly thick impervious formation of low resistivity. A bed of shale or clay, two or more times thicker than the distance between the electrodes $A_1$ and $A_2$ can be used, for example. While the electrode system is in this position, the current in the power circuit is adjusted until the S. S. P. meter reads zero, indicating that the difference of potential between the electrode M and the electrodes $G_1$ and $G_2$ is zero. The potential of the electrodes $G_1$ and $G_2$ with respect to the ground 26 is then noted from the meter V. Then a log is taken with meter S. S. P. while the electrode system is moved through the bore hole, the reading of meter V being maintained constant.

Figures 2A, 2B, 2C, 2D, 2E, 2F:
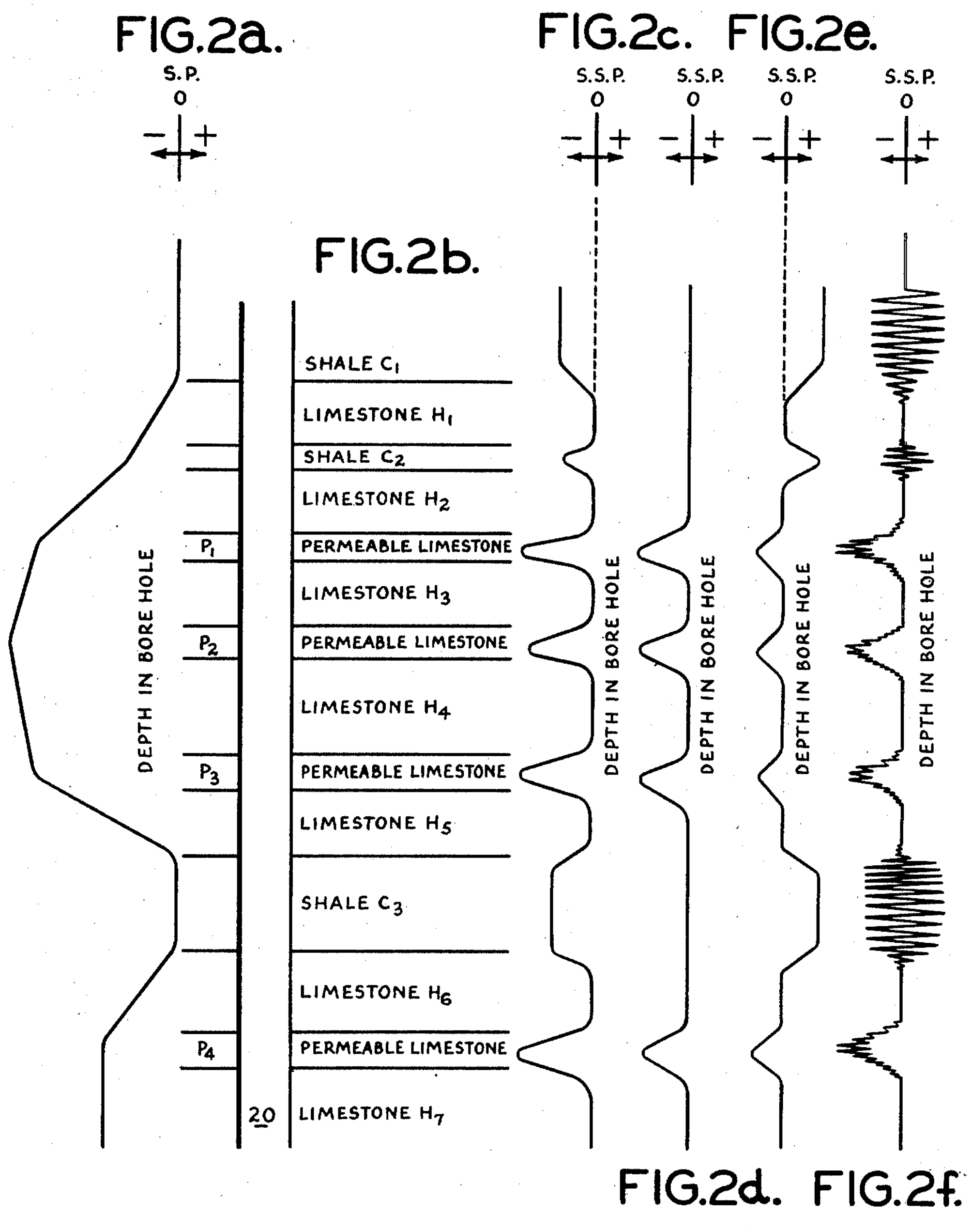
Fig. 2(*b*) illustrates a geological stratified formation traversed by a bore hole in which the logs of Figs. 2(*a*), 2(*c*), 2(*d*), 2(*e*) and 2(*f*) are assumed to have been made.

In operation, let it be assumed that the apparatus shown in Fig. 1 is lowered into the bore hole 20, shown in Fig. 2(*b*). In that figure, the bore hole 20 extends through a geological stratified formation such as may be encountered in oil fields, where oil may be present in limestone formations. The shale beds $C_1$, $C_2$ and $C_3$ represent impervious formations having a relatively low resistivity, namely, of the same order of magnitude as the resistivity of the mud contained in the bore hole. The limestone beds $H_1$, $H_2$, $H_3$, $H_4$, $H_5$, $H_6$ and $H_7$, which are not indicated as permeable, represent impervious formations of much greater resistivity than the shale beds. The permeable limestone beds $P_1$, $P_2$, $P_3$ and $P_4$ represent permeable formations which may be oil, or gas, or water bearing. Because such formations always contain a certain amount of water, their resistivities are less than the resistivity of impervious limestone beds. It is known that the permeable formations are the source of an E. M. F. established by electrofiltration and electrochemical phenomena. This E. M. F. generates currents which flow in the conductive mud of the bore hole and which follow paths extending along the bore hole from the boundary between a permeable stratum and an impervious formation.

A conventional S. P. log is shown in Fig. 2(*a*) for purposes of comparison. It will be seen from that figure that, although permeable beds are characterized on the log by a concavity towards the right, care must be exercised in interpreting the log if they are to be located accurately. In fact, the log does not show the thicknesses of the permeable beds.

In Fig. 2(*d*) is shown a Selective S. P. log recorded with the apparatus of Fig. 1 in the bore hole 20 of Fig. 2(*b*). As stated, the potential of the electrodes $G_1$ and $G_2$ was selected by adjusting the current flow of the power circuit so that the S. S. P. meter reads zero when the apparatus is opposite the shale bed $C_1$ shown at the top of Fig. 2(*b*). On the log of Fig. 2(*d*) the permeable formations are clearly indicated by a deflection, or peak, to the left and their boundaries can be easily determined. It will be noted that this log gives no appreciable indications of impervious beds of high resistivity $H_1$–$H_7$, inclusive.

As a practical matter, the deflections appearing on the log in Fig. 2(*d*) are not as large in absolute value as those on the log shown in Fig. 2(*a*) at the levels of the corresponding formations. The reason for this is that the deflections of the S. S. P. meter are a function of the separation distance between the electrodes $G_1$ and $G_2$ as well as of the resistivity of the formations. The smaller the separation distance, the smaller will be the deflection; also, the deflection will become smaller as the formation resistivity increases. Within limits, greater deflections can be obtained by increasing the spacing between the electrodes $G_1$ and $G_2$; however, this would also decrease the sharpness of the breaks in the curve. The separation distance given above for the electrodes $G_1$ and $G_2$ has been found to give a satisfactory log for practical purposes.

If the system shown in Fig. 1 is adjusted so that the potential of the electrodes $G_1$ and $G_2$ is made more positive than the potential used in making the log of Fig. 2(*d*), the shale beds $C_1$, $C_2$ and $C_3$, as well as the permeable formations $P_1$, $P_2$, $P_3$ and $P_4$, will be indicated by deflections toward the left, as shown in Fig. 2(*c*). However, the deflections at the levels of the shale beds are of lesser amplitude than those at the levels of the permeable formations. It is possible, therefore, to distinguish between the shale beds or impervious beds of low resistivity, the permeable beds and the impervious beds having a high resistivity.

On the other hand, if the potential of the electrodes $G_1$ and $G_2$ is made more negative than the potential used for the log of Fig. 2(*d*), but not as negative as the static S. P. of the permeable beds $P_1$–$P_4$, inclusive, a log of the type shown in Fig. 2(*e*) is produced. This condition will usually be satisfied if the potential of the electrodes $G_1$ and $G_2$ is made less negative than the negative potential which would have to be given to them to have the S. S. P. meter read zero when the electrode array is at the level of a permeable formation. In the log of Fig. 2(*e*) the shales $C_1$, $C_2$ and $C_3$ are clearly indicated by deflections to the right on the Selective S. P. log; the permeable beds are still indicated by deflections to the negative side, but with less amplitude than previously; and the highly resistive beds are indicated by negligible deflections.

If desired, the electrodes $A_1$ and $A_2$ can be eliminated and the potential applied to the electrodes $G_1$ and $G_2$ by connecting the latter directly to the power circuit, by means of an insulated conductor 31, as shown in Fig. 3. The remainder of the circuit is similar to that shown in Fig. 1, and corresponding parts have been designated by corresponding reference characters.

This device operates in essentially the same manner as the apparatus shown in Fig. 1, and approximately similar results will be obtained. However, practical difficulties such as, for example, polarization of the electrodes, may be encountered in its use.

It is possible to eliminate either the wire 30 or the wire 31 and connect the power circuit to the measuring circuit at the point 36. However, it is preferable to use independent wires for each circuit, in order to avoid the undesirable effects arising from the resistance of a common wire.

Although the embodiment shown in Fig. 3 is simpler than that illustrated in Fig. 1, it is preferred to use the latter because of its greater reliability and flexibility, and because it lends itself to modifications which are of importance for particular problems.

Figures 4, 5:
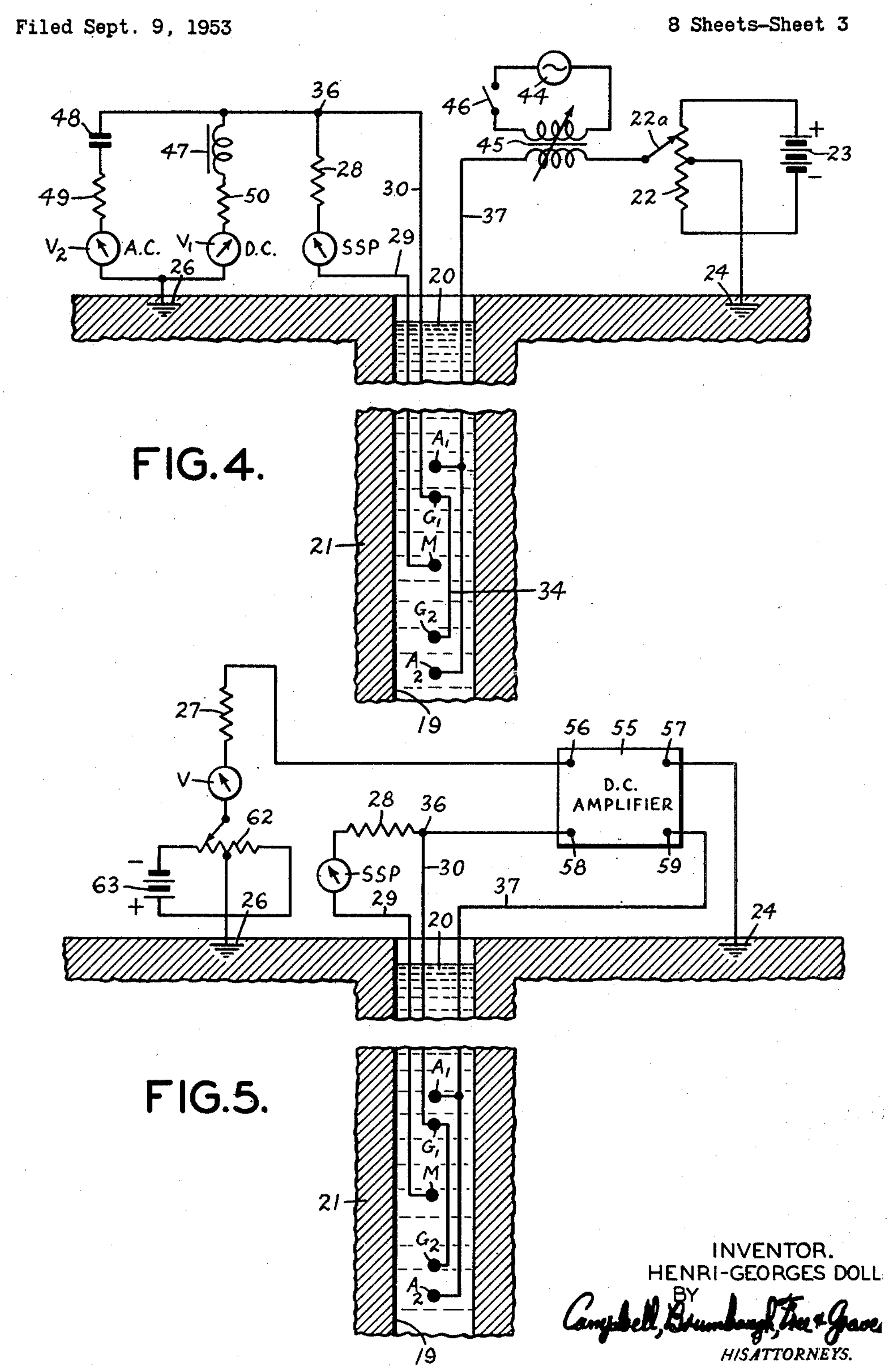
Fig. 4 illustrates schematically a further embodiment using direct and alternating current simultaneously to record a modulated Selective S. P. log.
Fig. 5 is a schematic diagram of another form of the invention in which the voltage applied to the two parallel-connected electrodes in the measuring circuit is controlled automatically.

Fig. 4 illustrates another embodiment of the invention, in which an A. C. modulation is introduced in the power circuit. In this embodiment, the power circuit includes an A. C. power source in addition to a D. C. power source. Thus, A. C. from a suitable source 44 is introduced into the power circuit through a transformer 45 of variable coupling. To this end, the secondary winding of the transformer 45 is connected in series with the conductor 37 and the potentiometer 22. A suitable switch 46 is connected in series with A. C. source 44 and the primary winding of the transformer 45.

The control circuit comprises two branches connected in parallel between the reference electrode or ground 26 and the junction point 36. One branch includes a choke coil 47 in series with a high resistance 50 and a D. C. meter $V_1$. The second branch includes a blocking condenser 48 in series with a high resistance 49 and an A. C. meter $V_2$.

In one method of operation, the potential of the electrodes $G_1$ and $G_2$ is selected as described above in connection with Fig. 1, with the switch 46 open. In this case, the potential of the electrodes $G_1$ and $G_2$ will be indicated by the meter $V_1$, and it will be maintained constant during a run. Alternating current is then applied to the apparatus by closing the switch 46 and the variable coupling of the transformer 45 is adjusted until the meter $V_2$ indicates that the desired A. C. potential is being applied to the electrodes $G_1$ and $G_2$. The particular potential employed depends on the results desired, as indicated in greater detail hereinafter.

The frequency of the A. C. should preferably be made low enough to enable its effect to be recorded by the S. S. P. meter. However, the S. S. P. meter may be of a type that will record fairly high frequencies, such as a cathode ray tube, for example, in which case any desired frequency can be employed.

After the power circuit has been adjusted as described above, the electrode assembly is moved along the open section of the bore hole under investigation, the readings of meters $V_1$ and $V_2$ being maintained constant during the run.

The Selective S. P. log obtained by operating in this manner is of the type shown in Fig. 2(*f*). It will be seen that it corresponds to a Selective S. P. log such as might be recorded with the apparatus of Fig. 1 or Fig. 3, to which a modulation of variable amplitude is added. The amplitude of the modulation will depend, among other things, on the value of the applied current as determined from the reading of the meter $V_2$.

For example, the D. C. potential of the electrodes $G_1$ and $G_2$ may be selected so that the S. S. P. meter reads substantially zero when the electrode array is opposite a thick shale, as discussed above. Now, if the peak-to-peak A. C. potential impressed on the electrodes $G_1$ and $G_2$, when the device is located at the level of said shale, corresponds in value to the change of potential required to be applied to the electrodes $G_1$ and $G_2$ to go from the log of Fig. 2(*d*) to the log shown in Fig. 2(*e*), then the envelopes of the Modulated Selective S. P. log of Fig. 2(*f*) will correspond to the logs shown in Figs. 2(*c*) and 2(*e*), respectively. Of course, this assumes that the deflections of the logs shown in Figs. 2(*c*) and 2(*e*) opposite the shale $C_1$ of Fig. 2(*b*) are equal in magnitude. Thus, it is possible to obtain at least two different Selective S. P. curves during a single traverse by modulating the potential applied to the electrodes $G_1$ and $G_2$. The D. C. potential and A. C. modulation applied between the electrodes $G_1$ and $G_2$ and ground may be selected according to the type of selective S. P. log which may be desired. For practical purposes, it has ben found that satisfactory results can be obtained if the peak-to-peak magnitude of the A. C. modulating voltage is in the range from 50 to 500 millivolts, although these values are not restrictive.

Instead of impressing a constant D. C. potential between the electrodes $G_1$ and $G_2$ and ground, and modulating it with an A. C. potential of constant peak-to-peak amplitude, two D. C. potentials of different substantially constant magnitudes might be impressed on electrodes $G_1$ and $G_2$ in rapid succession, by means of a suitable power circuit. For example, the power circuit might include two separate D. C. power sources like the battery 23 and potentiometer 22 of Fig. 1, for example, together with suitable switching means such as a commutator, for example, for connecting them successively in the power circuit. A second commutator mechanism operated in synchronism with the commutator in the power circuit might be employed for connecting two indicating meters successively between the junction 36 and the ground 26 in the control circuit. By choosing indicating meters with sufficient inertia, the readings will be steady enough to permit the two potentials impressed on the electrodes $G_1$ and $G_2$ to be adjusted to the desired constant values. The S. S. P. meter will then record a modulated Selective S. P. log, and the two envelopes will correspond to two Selective S. P. logs, recorded, respectively, with each of the two selected potentials impressed successively on the electrodes $G_1$ and $G_2$.

If desired, two S. S. P. meters can be used in the measuring circuit and commutated in synchronism with the two different impressed potentials, to record simultaneously two different Selective S. P. logs.

Fig. 5 shows another embodiment of the invention, whereby the control of the potential impressed between electrodes $G_1$ and $G_2$ and ground is automatically maintained at a constant value. In this case, the control potential is applied to the input of a D. C. amplifier, the output of which is connected in the power circuit. The electrodes $G_1$ and $G_2$ are connected through an insulated conductor 30 to the input terminal 58 of the D. C. amplifier 55. The other amplifier input terminal 56 is connected to a resistance 27 and the meter V, and then in series with a suitable source of D. C. voltage to the ground or reference electrode 26. The D. C. voltage source may comprise, for example, a potentiometer 62 energized by a battery 63, and it permits the adjustment of the potential of the electrodes $G_1$ and $G_2$, without affecting the operation of the D. C. amplifier 55; in this manner, contact potentials, for example, such as occur at the electrode 26 and the ground, may be counterbalanced.

The electrodes $A_1$ and $A_2$ of Fig. 5 are connected to one output terminal 59 of the amplifier 55, the other output terminal 57 being connected to the ground at point 24.

The amplifier 55 may be of any conventional type designed to provide a power output that is a function of the voltage input. Furthermore, the connections to the ampulifier 55 are so arranged that substantially 100% degenerative feedback obtains between its output and input terminals. Under these conditions, the amplifier 55 tends to keep the voltage across its input terminals to a null value, so that the potential applied between electrodes $G_1$ and $G_2$ and ground, is maintained substantially constant.

The measuring circuit comprises the meter S. S. P. which is connected through the conductor 29 to the electrode M and through the resistance 28 and the conductor 30 to the electrodes $G_1$ and $G_2$.

In operation, the electrode array is placed at a location in the bore hole where the potential corresponds to the one selected for the electrodes $G_1$ and $G_2$. The variable contact of the potentiometer 62 then is adjusted until the meter V indicates a null reading. Then the amplifier 55 is turned on, and the recording of the S. S. P. log is made while the electrode array is displaced along the bore hole.

Figure 6:
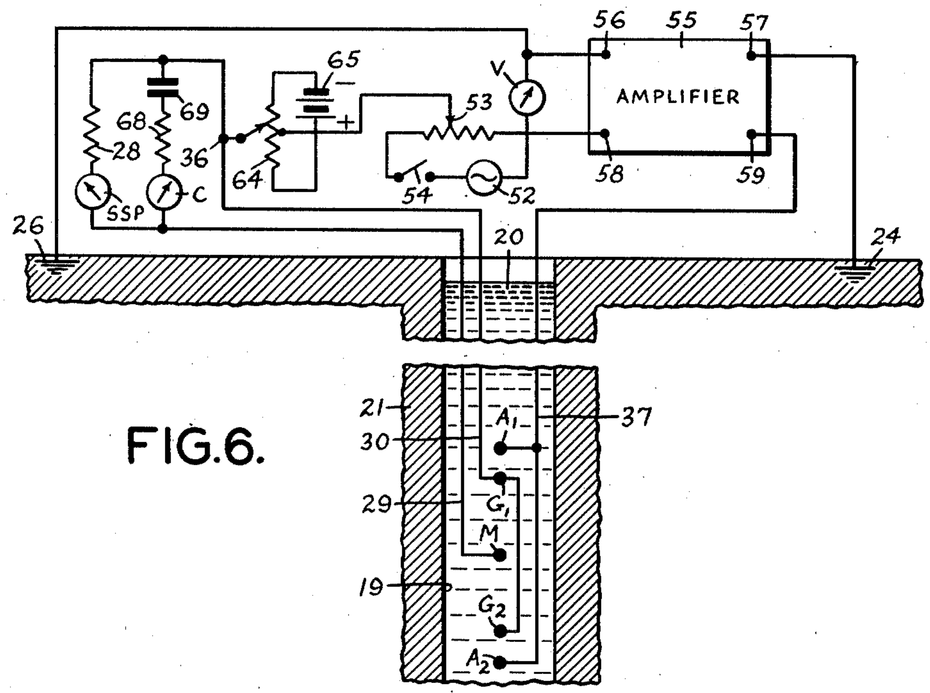
Fig. 6 illustrates schematically another embodiment for making simultaneously a Selective S. P. log and a log of electrical conductivity.

The embodiment of the invention shown in Fig. 6 enables a Modulated Selective S. P. log to be recorded simultaneously with a log of the conductivity of the formations, the D. C. and A. C. potentials impressed between the electrodes $G_1$ and $G_2$ and ground, being controlled automatically.

The power circuit of the system shown in Fig. 6 is similar to the one described above in connection with Fig. 5, and corresponding parts have been designated by corresponding reference characters. The measuring circuit comprises two branches in parallel and connected to the electrode M and to the electrodes $G_1$ and $G_2$ through the insulated wires 29 and 30, respectively. One of the branches comprises the S. S. P. meter and its resistance 28, while the other branch comprises a recording type indicating apparatus C, its resistance 68 and a blocking condenser 69.

The control circuit includes the electrodes $G_1$ and $G_2$, the insulated conductor 30, a potentiometer 64 energized by a D. C. source 65, a potentiometer 53 adapted to be energized by an A. C. source 52 through a switch 54, a high resistance meter V in parallel with the input terminals of the amplifier 55, and the ground 26.

In operation, the switch 54 is first opened, and the D. C. potential impressed on electrodes $G_1$ and $G_2$ is adjusted as described above. Then the switch 54 is closed, thereby permitting a suitable A. C. potential to be impressed on electrodes $G_1$ and $G_2$, and the amplifier 55 is turned on. The action of the amplifier 55 not only maintains the D. C. potential impressed on the $G_1$ and $G_2$ electrodes constant, but also insures that the A. C. potential impressed on said $G_1$ and $G_2$ electrodes is kept constant in magnitude during the logging run. Accordingly, a Modulated Selective S. P. log will be recorded by the meter S. S. P. This log will correspond to the log shown in Fig. 2(*f*) or the log of Fig. 7(*b*).

In addition, the alternating potential difference alone will be recorded by the meter C, the direct component being blocked by the condenser 69. It has been found that the amplitude of the A. C. recorded by the meter C is a function of the apparent conductivity of the formation opposite the electrode array. A typical conductivity log recorded by the meter C is illustrated in Fig. 7(*c*).

Fig. 7(*a*) shows schematically a geological stratified formation comprising some permeable formations $R_p$ of medium resistivity, some impervious strata $R_c$ of low resistivity such as shales or clays, for example, some hard, resistive and impervious formations $R_h$, and some impervious formations $R_L$ of intermediate resistivity. A typical conventional S. P. log such as might be obtained in a bore hole traversing the formations is superimposed on the geological stratified formation for convenience.

The log of Fig. 7(*b*) is a typical log such as might be recorded by the meter S. S. P. of Fig. 6 for the stratified formation shown in Fig. 7(*a*) while the log of Fig. 7(*c*) is of the type that would be recorded by the meter C for the same stratified formation. It will be seen that the determination of the geological formations is greatly facilitated by the use of the logs of Figs. 7(*b*) and 7(*c*).

Figs. 8(*a*) and 8(*c*), respectively, show a conventional S. P. log and a Modulated S. P. log actually recorded over the same section of a bore hole in the field with the apparatus shown in Fig. 6. In addition, in Fig. 8(*b*) is shown a static S. P. log which has been computed from the Modulated S. P. log of Fig. 8(*c*).

In order to obtain the static S. P. log such as is shown in Fig. 8(*b*), it is necessary to determine the null position of the S. S. P. meter, on the Modulated Selective S. P. log of Fig. 8(*c*). This can be done in several ways. For instance, if the impressed D. C. potential is adjusted so as to give a null deflection on the S. S. P. meter when the electrode array is located opposite a thick shale section, for that location of the electrode device the null position will lie half-way between the two envelopes of the modulation appearing on the Modulated Selective S. P. log. The null position can also be found as the limit approached by the modulation envelopes as the amplitude of the modulation becomes very small; such point corresponds to very resistive formations where the difference of potential between electrodes $G_1$ and $G_2$ and the electrode M is practically nil. On the Modulated Selective S. P. log shown in Fig. 8(*c*), the null position is indicated by a dashed line.

The computed static S. P. log of Fig. 8(*b*) is based upon the premise that if the potential of the electrodes $G_1$ and $G_2$ corresponds to the static S. P. at a particular location, then for that location, the value of the Selective S. P. log should be zero, i. e. it should be at the null deflection position. Since the departure of each envelope of the Selective S. P. log from the null deflection position is directly proportional to the potential impressed on the electrodes $G_1$ and $G_2$, then the static S. P. for a formation can be considered to be equal to the potential that would have to be applied to the electrodes $G_1$ and $G_2$ to bring one of the modulation envelopes to the null deflection position.

In practice, this can be done by measuring on the log, for each level, the lateral distances between the null deflection positioned and each of the modulation envelopes. Then, knowing the A. C. potential impressed between the electrodes $G_1$ and $G_2$ and the ground 26 during the recording of the Modulated Selective S. P. log, the potential that would be necessary to bring one of the envelopes to the null deflection position can be readily determined as the ratio of the distance from that envelope to the null position, to the total distance between the two envelopes, multiplied by the peak-to-peak magnitude of the A. C. voltage applied to the electrodes $G_1$ and $G_2$. A plot of such computed potential values will give the static S. P. log shown in Fig. 8(*b*).

For example, if the A. C. potential impressed on the electrodes $G_1$ and $G_2$ during the recording of the log of Fig. 8(*a*) is $V_0 \sin wt$, at the level 6100′ the static S. P. will be $$2V_0 \times \frac{ao}{ab}$$

It will be understood that the static S. P. log can also be computed from two separate Selective S. P. logs made with different values of D. C. potential, respectively, applied to the electrodes $G_1$ and $G_2$.

Fig. 9 illustrates a preferred embodiment of the invention which enables a Modulated Selective S. P. log to be recorded simultaneously with a conductivity log, the potentials impressed between the electrodes $G_1$ and $G_2$ and ground 26 being controlled automatically. In this embodiment, the ground 24 is replaced by an electrode B lowered into the bore hole 20 and located at a relatively large fixed distance, say 10 meters, for example, from the other electrodes, so as not to affect appreciably the potential of the other electrodes. It can be seen that the change in the location of the electrode connecting the terminal 57 of amplifier 55 to ground does not modify the operation of the apparatus. Such change could be made in all the other embodiments of the invention without changing the results.

The control circuit of Fig. 9 is identical to the control circuit of Fig. 6 and like parts are designated by like reference characters. The Modulated Selective S. P. is measured by means of the S. S. P. meter, as described above in connection with Fig. 6.

On the other hand, the conductivity meter C′ is now placed in series with a blocking condenser 69′ in the connecting wire between the amplifier terminal 57 and the ground electrode B. In parallel with the meter C′ and its condenser 69′ is a suitable choke 70. The D. C. supplied by the amplifier to the power circuit will flow through the choke 70, while the A. C. will pass through condenser 69′ and meter C′ where it will be measured.

As the A. C. potential impressed on the electrodes $G_1$ and $G_2$ is maintained constant, the A. C. flowing in the ground between electrodes $A_1$, $A_2$ and B will vary in direct proportion to the conductivity of the formation. Accordingly, the current measured by meter C′ will be proportional to the conductivity of the formation.

In the several embodiments of the invention described above, the electrodes $G_1$ and $G_2$, as well as electrodes $A_1$ and $A_2$, have been shown connected together by conductors. In some cases, it may be desirable to introduce resistances, either between each of the electrodes $G_1$, $G_2$ and the wire 30, or between each of the electrodes $A_1$, $A_2$ and the wire 37, or both, as shown in Fig. 10. If the device is symmetrical with respect to the electrode M, the resistance 141 should preferably be made equal to the resistance 142, these resistances connecting the electrodes $G_1$ and $G_2$, respectively, to the insulated wire 30. However, if electrodes $G_1$ and $G_2$ are not identical, it may be that their resistances in the mud will be different. In such case, the differences may be compensated by giving different values to the resistances 141 and 142. Also, if the electrode device is not symmetrical, it may be found desirable to make the resistances 141 and 142 of different value in order to obviate the asymmetry of the device.

Similarly the resistances 143 and 144, which are in series, respectively, with the electrodes $A_1$ and $A_2$ in Fig. 10, can be chosen of equal value, if the electrode device is symmetrical. In this manner, the introduction of resistances in series with the electrodes $A_1$ and $A_2$ will tend to insure that the current flowing in each electrode is of equal value. On the other hand, if there is asymmetry, either geometrical, or electrical, such asymmetry can be compensated for by using different values for the resistances 143 and 144.

In the modification of the invention shown in Fig. 11, the conductors connecting the electrodes $G_1$ and $G_2$ to one another and the electrodes $A_1$ and $A_2$ to one another have been omitted. Instead, two amplifiers 55' and 55, which separately control the potential of each of the electrodes $G_1$ and $G_2$ are used. In some cases, it may be found desirable to use two distinct controls for the electrodes $G_1$ and $G_2$, and this can be done for the various embodiments herein described. The electrode $A_1$ in Fig. 11 is connected to the output terminal 59' of the amplifier 55' through an insulated wire 113, the other output terminal 57' being grounded at 124'. Similarly, the electrode $A_2$ is connected to the output terminal 59 of the amplifier 55 through an insulated wire 111, the other output terminal 57 being grounded at 124.

One control circuit comprises the electrode $G_1$, an insulated wire 112, the input terminal 58' of the amplifier 55', the amplifier terminal 56', a resistance 127', the control meter V', a potentiometer 62' energized by a suitable D. C. source 63' and the ground 26'. The other control circuit comprises the electrode $G_2$, an insulated wire 110, the input terminal 58 of the amplifier 55, the amplifier input terminal 56, a resistance 127, the control voltmeter V, a potentiometer 62 energized by a suitable D. C. source 63 and the ground 26.

The measuring circuit includes the electrode M, the insulated wire 29, the meter S. S. P. with its resistance 128, and the junction point 136.

In operation, the potential impressed on electrodes $G_1$ and $G_2$ is controlled by means of the meters V' and V with their associated potentiometer circuits. Preferably, the potential of electrode $G_1$ is made equal to the potential of electrode $G_2$. The amplifiers 55' and 55 will maintain the potential of the electrodes $G_1$ and $G_2$ constant by supplying appropriate currents through the electrodes $A_1$ and $A_2$.

As the potential of the electrodes $G_1$ and $G_2$ is maintained constant, the meter S. S. P. may be connected between the M electrode and either of the electrodes $G_1$ or $G_2$ at the junction point 136. If the potential of the electrode $G_1$ is made equal to the potential of the electrode $G_2$ the meter S. S. P. may be connected to both electrodes at the point 136. The meter S. S. P. will record a Selective S. P. log as previously described.

Fig. 12 illustrates a system designed to record simultaneously a Selective S. P. log and a resisitivity log of the formations. In this apparatus, the electrodes $A_1$ and $A_2$ of the power circuit are connected through the insulated wire 37, a choke 80 and the potentiometer 22 to a suitable source of D. C. current 23. The circuit is closed through the ground by means of the electrode or ground 24.

The control circuit comprises the electrodes $G_1$ and $G_2$, the insulated wire 30, the chokes 76 and 75, the resistance 27 and the indicating apparatus V, to the ground reference 26. The measuring circuit includes the meter S. S. P. in series with the resistance 28, a choke 74, an insulated wire 29 and the electrode M.

The operation of the apparatus, in so far as the Selective S. P. log is concerned, is similar to the operation described above, for instance, in connection with Fig. 1. The chokes introduced in the three branches of the circuit are for the purpose of preventing any A. C. from flowing in the sections of circuit incorporating said chokes.

A source of periodically variable current 78, in series with a blocking condenser 77 and an ammeter I, is inserted between the wire 30 and the wire 37. The periodically variable current will flow between the electrodes $A_1$ and $A_2$ and the electrodes $G_1$ and $G_2$, impressing a periodically variable potential on the electrode M with respect to the ground point 82. This potential will be measured by a meter R which is connected in series with blocking condenser 73. The indications of the meter R will permit the electrical resistivity of the stratum opposite the electrode array to be computed. If the current flowing through the meter I is maintained constant, the difference of potential recorded by the meter R will be proportional to the resistivity of the formations.

If desirable, an automatic control may be used in the circuit instead of the manually adjusted source of current shown at 22 and 23. Similarly, other modifications described previously can be introduced in this apparatus without changing the results obtained.

Another embodiment of the invention is shown in Fig. 13 which illustrates alternative circuits whereby either a Selective S. P. log or a Static S. P. log, such as described in the applicant's prior United States Patent No. 2,592,125, can be recorded simultaneously with a pressure-vibrated S. P. curve. In the applicant's prior United States Patent No. 2,550,005, there is disclosed a method and apparatus for obtaining indications of changes in the S. P. caused by pressure variations applied to the mud contained in the bore hole. The mechanical device used to produce pressure changes, which need not be described in detail herein, can be used in connection with the alternative circuits shown in Fig. 13.

In Fig. 13, when the circuit is arranged for the simultaneous recording of a Selective S. P. log and a pressure-vibrated S. P. log, the electrodes $A_1$ and $A_2$ are connected to the output terminal 59 of the amplifier 55 through the wire 37. The other amplifier output terminal 57 is connected to ground at 24. The control circuit comprises the electrodes $G_1$ and $G_2$ connected to the input terminal 58 of the amplifier through the wire 30 and the potentiometer 64 which is energized by the battery 65. The other input terminal 56 of the amplifier is connected through a closed contact (shown by solid line) of a switch 90 to a ground electrode 26. In parallel with the amplifier input terminals is connected a meter V to assist in the adjustment of the potential of the electrodes $G_1$ and $G_2$ and in the control of the operation of the amplifier 55.

The measuring circuit comprises the electrode M connected through the wire 29, the two measuring branches connected in parallel, and a closed contact (shown by solid line) of a switch 91 to the junction 36. The left hand branch comprises a meter S. S. P., a resistance 28 and a choke coil 61. The right hand branch includes the meter $V_3$, a resistance 68 and a blocking condenser 60.

On the other hand, in order to record simultaneously a Static S. P. log and a pressure-vibrated S. P. log, the switches 90 and 91 of Fig. 13, are moved to the positions shown by the dashed lines. For these alternative switch positions, the control circuit comprises the electrode M connected to the input terminal 56 of the amplifier 55, through the wire 29, the wire 92 and the closed contact (shown by the dashed line) of the switch 90. The input terminal 58 of the amplifier 55 remains connected through the potentiometer 64, the junction 36 and the wire 30 to the electrodes $G_1$ and $G_2$.

The measuring circuit, when the switches 90 and 91 are in their alternative positions, comprises the electrode M, the wire 29, the two parallel measuring branches and the closed contact (shown by the dashed line) of the switch 91 connected to the ground electrode 26.

By combining a Selective S. P. system or a Static S. P. system with a pressure-vibrated S. P. system as shown in Fig. 13, a log can be obtained on which the permeable formations, where electrofiltration takes place, are more clearly defined. This is especially true where such permeable formations are located adjacent resistive formations.

In some cases, useful results can be obtained without applying any external potential to the electrodes $G_1$ and $G_2$ of the embodiment shown in Fig. 3, the power and control circuits being omitted. When such an electrode array is moved through a bore hole, a log of the potential between the M electrode and the electrodes $G_1$ and $G_2$ will deflect significantly at the boundaries of permeable formations.

From the foregoing, it will be understood that the invention provides a novel and highly effective method and apparatus for investigating earth formations traversed by a bore hole. By utilizing a potential measuring electrode located intermediate two other electrodes, and adjusting the potential of said two electrodes as described herein, logs may be obtained which enable permeable and impervious formations to be more readily differentiated than has been possible heretofore.

In the embodiments described above which employ modulation, the frequency of the modulating signal should preferably be made low enough to avoid undesirable phase shifts in the several circuits. However, higher frequencies may be used provided suitable phase shifting means are employed to compensate for any undesirable phase shifts that may occur.

It will be further understood that the several embodiments disclosed herein by way of illustration are susceptible of numerous modifications within the scope of the invention. Other suitable circuit components such as meters, amplifiers, etc., will suggest themselves to persons skilled in the art. The illustrative embodiments described above, therefore, are not to be regarded as limiting in any way the scope of the following claims.

I claim:

1. In a method of investigating earth formations traversed by a bore hole containing a relatively conductive fluid, the steps of establishing an electrical field in the bore hole and surrounding earth formations in the vicinity of two spaced-apart points to modify the naturally-occurring currents therein, controlling said electrical field to maintain an electrical value dependent thereon substantially constant, producing periodically variable pressure variations in the bore hole fluid so as to generate periodically variable electrofiltration potentials opposite permeable formations, and obtaining indications of variations in the potential difference between one of said two spaced-apart points and a reference point.

2. In a method of investigating earth formations traversed by a bore hole containing a relatively conductive fluid, the steps of establishing an electrical field in the bore hole and surrounding earth formations in the vicinity of two spaced-apart points to modify the naturally-occurring currents therein, controlling said electrical field to maintain an electrical value dependent thereon substantially constant, producing periodically variable pressure variations in the bore hole fluid so as to generate periodically variable electrofiltration potentials opposite permeable formations, obtaining indications of variations in the continuous potential difference between a point intermediate said two spaced-apart points and a reference point, and obtaining indications of periodically variable potential differences between said intermediate point and said reference point.

3. In a method of investigating earth formations traversed by a bore hole containing a relatively conductive fluid, the steps of establishing an electrical field in the bore hole and surrounding earth formations in the vicinity of two spaced-apart points to modify naturally-occurring currents therein, controlling said electrical field to maintain a substantially constant potential difference between said two spaced-apart points and a relatively remote reference point, producing periodically variable pressure variations in the bore hole fluid so as to generate periodically variable electrofiltration potentials opposite permeable formations, obtaining indications of variations in the continuous potential difference between said two spaced-apart points and a point intermediate said two spaced-apart points, and obtaining indications of periodically variable potential differences between said two spaced-apart points and said intermediate point.

4. In a method of investigating earth formations traversed by a bore hole containing a relatively conductive fluid, the steps of establishing an electrical field in the bore hole and surrounding earth formations in the vicinity of two spaced-apart points to modify the naturally-occurring currents therein, controlling said electrical field to maintain a substantially constant potential difference between said two spaced-apart points and a point intermediate thereof, producing periodically variable pressure variations in the bore hole fluid so as to generate periodically variable electrofiltration potentials opposite permeable formations, obtaining indications of variations in the continuous potential difference between said intermediate point and a relatively remote reference point, and obtaining indications of periodically variable potential differences between said intermediate point and said reference point.

5. In a method of investigating earth formations traversed by a bore hole containing a relatively conductive fluid, the steps of lowering into the bore hole at least three longitudinally spaced-apart electrodes, modifying naturally-occurring currents in a portion of the bore hole by maintaining a substantially constant potential difference between the two outer electrodes and a relatively remote reference point, producing periodically variable pressure variations in the bore hole fluid so as to generate periodically variable electrofiltration potentials opposite permeable formations, obtaining indications of variations in the D. C. potential between the third electrode and said two outer electrodes, and obtaining indications of periodically variable potential differences between said third electrode and said two outer electrodes.

6. In a method of investigating earth formations traversed by a bore hole containing a relatively conductive fluid, the steps of lowering into the bore hole at least three longitudinally spaced-apart electrodes, modifying naturally occurring currents in a portion of the bore hole by maintaining a substantially constant potential difference between the two outer electrodes and the third electrode intermediate thereof, producing periodically variable pressure variations in the bore hole fluid so as to generate periodically variable electrofiltration potentials opposite permeable formations, obtaining indications of variations in the D. C. potential differential between said intermediate electrode and a relatively remote reference point, and obtaining indications of periodically variable potential differences between said intermediate electrode and said remote reference point.

7. In well logging apparatus, the combination of at least two longitudinally spaced-apart electrodes adapted to be lowered into a bore hole containing a relatively conductive fluid, means for modifying the flow of naturally-occurring currents within a portion of the bore hole to maintain a substantially constant potential difference between one of said spaced-apart electrodes and a reference point, means for periodically varying the hydrostatic pressure of said bore hole fluid, and means for exhibiting a function of the potential difference between the other of said two spaced-apart electrodes and a reference point.

8. In well logging apparatus, the combination of at least two longitudinally spaced-apart electrodes adapted to be lowered into a bore hole containing a relatively conductive fluid, means for modifying the flow of naturally-occurring currents within the bore hole to maintain a substantially constant potential difference between two of said spaced-apart electrodes and a reference point other than said two spaced-apart electrodes, means for periodically varying the hydrostatic pressure of said bore hole fluid, means for indicating the continuous potential difference between a point intermediate said two spaced-apart electrodes and a reference point, and means for indicating periodically variable potential differences between said intermediate point and said reference point.

9. In well logging apparatus, the combination of an electrode array adapted to be lowered into a bore hole containing a relatively conductive fluid, said array comprising inner and outer pairs of longitudinally spaced-apart electrodes and an electrode intermediate the electrodes of said inner pair, amplifier means having input terminals connected to one of said pairs of electrodes and to a reference point other than said one of said pairs of electrodes, respectively, and having output terminals connected to a relatively remote reference point and to the other of said pairs of electrodes, respectively, said amplifier means being connected for degenerative feedback between the output and input terminals thereof, means for producing periodic pressure variations in the bore hole fluid so as to generate periodically variable electro-filtration potentials at the levels of permeable formations, and means for obtaining indications of the potential difference between said intermediate electrode and a reference point.

10. In well logging apparatus, the combination of an electrode array adapted to be lowered into a bore hole containing a relatively conductive fluid, said array comprising inner and outer pairs of longitudinally spaced-apart electrodes and an electrode intermediate the electrodes of said inner pair, amplifier means having input terminals connected to one of said pairs of electrodes and to a reference point other than said one of said pairs of electrodes, respectively, and having output terminals connected to a relatively remote reference point and to the other of said pairs of electrodes, respectively, said amplifier means being connected for degenerative feedback between the output and input terminals thereof, means for producing periodic pressure variations in the bore hole liquid so as to generate periodically variable electrofiltration potentials at the levels of permeable formations, means for obtaining indications of only the D. C. component of the potential difference between said intermediate electrode and a reference point, and means for obtaining indications of only the periodically variable component of the potential difference between said intermediate electrode and said reference point.

11. In well logging apparatus, the combination of an electrode array adapted to be lowered into a bore hole containing a relatively conductive fluid, said array comprising inner and outer pairs of longitudinally spaced-apart electrodes and an electrode intermediate the electrodes of said inner pair, all of said electrodes being mounted in fixed relation to each other, amplifier means having input terminals connected to a relatively remote reference point and to one of said pairs of electrodes, respectively, and having output terminals connected to a relatively remote reference point and to the other of said pairs of electrodes, respectively, said amplifier means being connected for degenerative feedback between the output and input terminals thereof, a source of control voltage connected in series with said amplifier input means, means for producing periodic pressure variations in the bore hole liquid so as to generate periodically variable electrofiltration potentials at the levels of permeable formation, means for obtaining indications of only the D. C. component of the potential difference between said intermediate electrode and said one pair of electrodes, and means for obtaining indications of only the periodically variable component of the potential difference between said intermediate electrode and said one pair of electrodes.

12. In well logging apparatus, the combination of an electrode array adapted to be lowered into a bore hole containing a relatively conductive fluid, said array comprising inner and outer pairs of longitudinally spaced-apart electrodes and an electrode intermediate the electrodes of said inner pair, all of said electrodes being mounted in fixed relation to each other, amplifier means having input terminals connected to one of said pairs of electrodes and to said intermediate electrode, respectively, and having output terminals connected to a relatively remote reference point and to the other of said pairs of electrodes, respectively, said amplifier means being connected for degenerative feedback between the output and input terminals thereof, means for producing periodic pressure variations in the bore hole fluid so as to generate periodicaly variable electrofiltration potentials at the levels of permeable formations, means for obtaining indications of only the D. C. component of the potential difference between said intermediate electrode and a relatively remote reference point, and means for obtaining indications of only the periodically variable component of the potential difference between said intermediate electrode and a relatively remote reference point.

No references cited.